(12) United States Patent
Desmeules

(10) Patent No.: US 8,221,032 B2
(45) Date of Patent: Jul. 17, 2012

(54) SOIL PENETRATING PLATE ASSEMBLY TO POSITION GEOTHERMAL CONDUIT LOOPS IN SOIL

(75) Inventor: Alain Desmeules, Montreal (CA)

(73) Assignee: Pretech, Montreal, Quebec (CA)

( * ) Notice: Subject to any disclaimer, the term of this patent is extended or adjusted under 35 U.S.C. 154(b) by 219 days.

(21) Appl. No.: 12/497,560

(22) Filed: Jul. 3, 2009

(65) Prior Publication Data
US 2011/0002740 A1 Jan. 6, 2011

(51) Int. Cl.
*F16L 1/00* (2006.01)
*F24J 3/08* (2006.01)
(52) U.S. Cl. ............ 405/184.4; 405/184; 405/174; 405/154.1; 165/45
(58) Field of Classification Search .............. 405/184, 405/184.4, 184.5, 154.1, 174, 178; 165/45
See application file for complete search history.

(56) References Cited

U.S. PATENT DOCUMENTS

| | | | | |
|---|---|---|---|---|
| 5,623,986 A * | 4/1997 | Wiggs | | 165/45 |
| 6,672,371 B1 * | 1/2004 | Amerman et al. | | 165/45 |
| 6,920,924 B2 * | 7/2005 | Roesch et al. | | 166/71 |
| 7,223,052 B1 * | 5/2007 | Evans | | 405/184.4 |
| 7,380,605 B1 * | 6/2008 | Wolf | | 166/302 |
| 2008/0124178 A1 * | 5/2008 | Rohde et al. | | 405/184.5 |

* cited by examiner

*Primary Examiner* — Kenneth L Thompson
*Assistant Examiner* — Kyle Armstrong
(74) *Attorney, Agent, or Firm* — Norton Rose Canada LLP

(57) ABSTRACT

A soil penetrating plate to position a flexible geothermal conduit loop in spoil is described. The soil penetrating plate has a leading soil penetrating formation which is provided with hook arrangements to hook an end loop portion of a conduit loop. The soil penetrating plate is securable to a force transmitting shaft or cable to displace the soil penetrating plate in soil whereby to position the conduit loop thereinto.

16 Claims, 10 Drawing Sheets

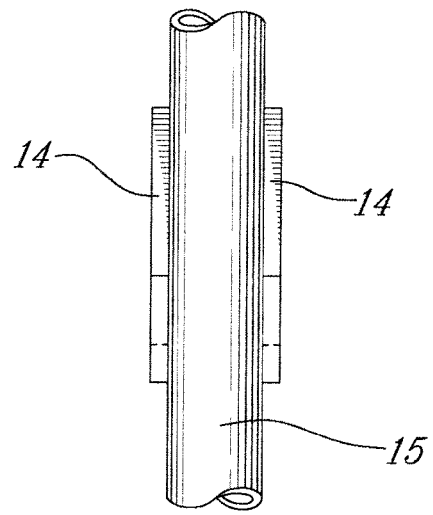
Fig-4
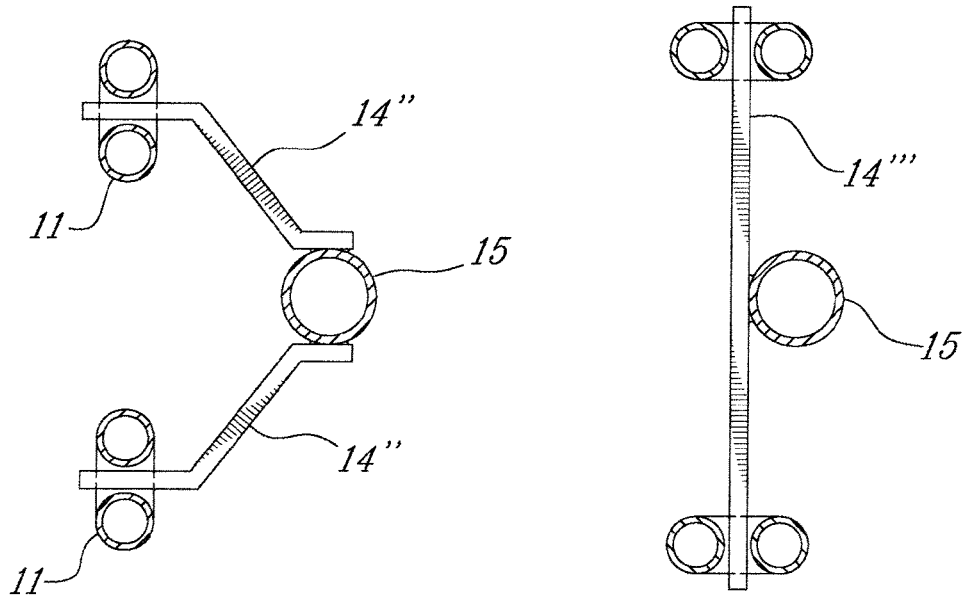
Fig-5A
Fig-5B

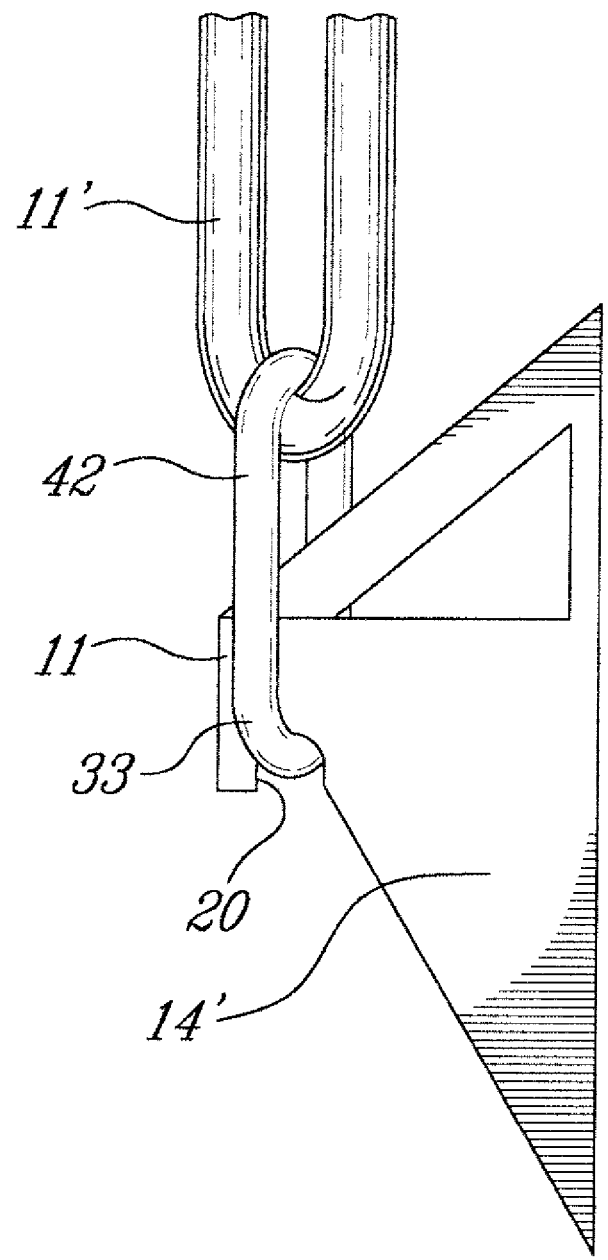

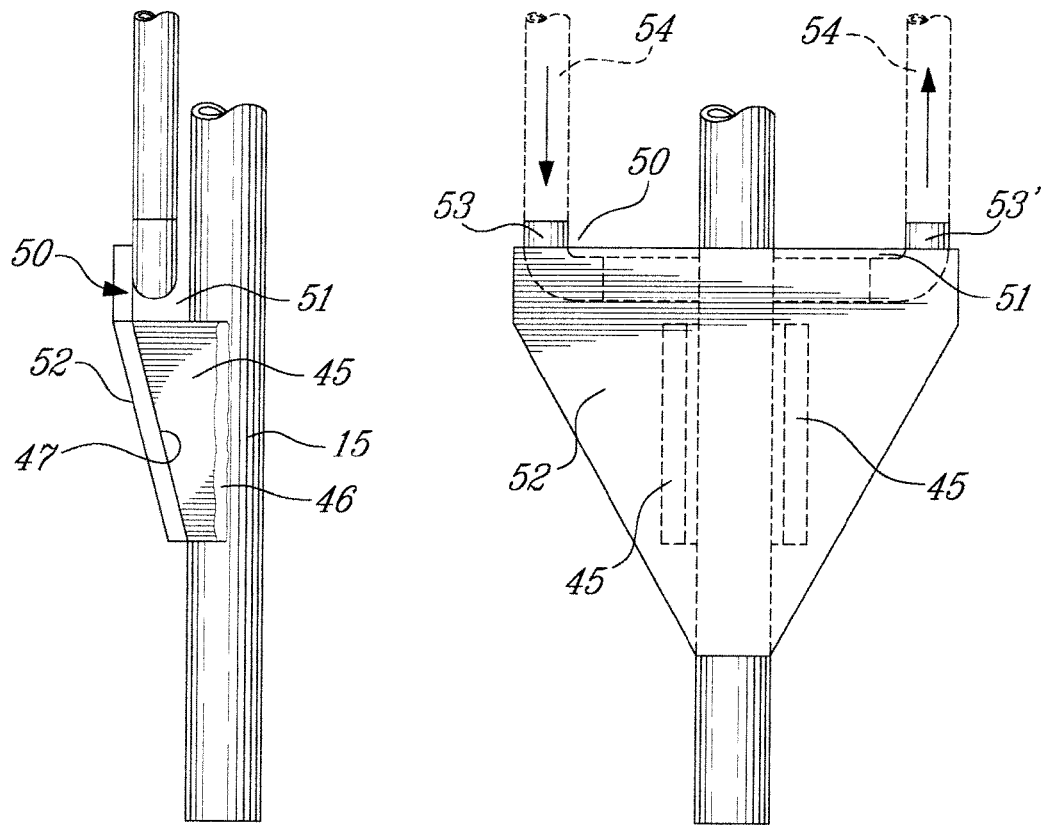
Fig_14A      Fig_14B
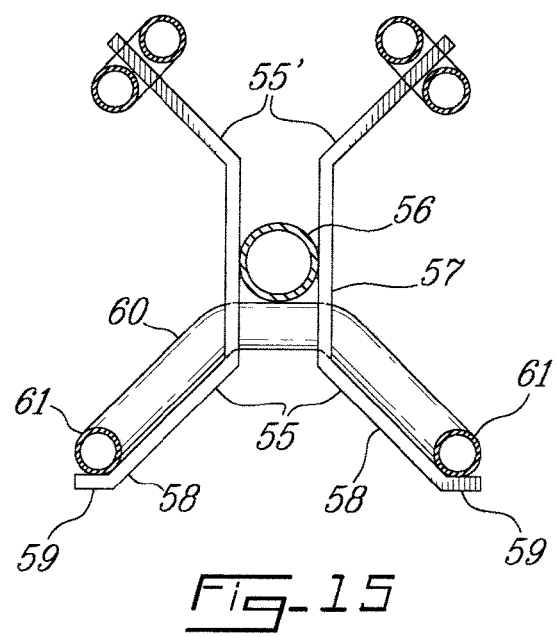
Fig_15

SOIL PENETRATING PLATE ASSEMBLY TO POSITION GEOTHERMAL CONDUIT LOOPS IN SOIL

TECHNICAL FIELD

The present invention relates to a soil penetrating plate assembly to position a flexible geothermal conduit loop in soil to capture thermal energy stored in the soil.

BACKGROUND ART

Reference is made to my co-pending U.S. application Ser. No. 12/320,754, which was filed on Feb. 5, 2009 and entitled "System and method for geothermal conduit loop in-ground installation and soil penetrating head therefor". In that application I describe the construction of a soil penetrating head of various configuration which is driven into the soil and simultaneously draws a conduit loop. The soil penetrating head and conduit loop remain in the soil after it is driven thereinto by a force transmitting shaft, such as driven by a drill or a percussion apparatus. This method of disposing conduit loops into the ground greatly facilitates the installation of the loop in soil and reduces costs considerably.

The soil penetrating plate which is described in this application further simplifies the installation of the conduit loops and further reduces cost. The soil penetrating plate assembly is an improvement of the soil penetrating head described in my above-referenced application.

SUMMARY OF INVENTION

It is therefore a feature of the present invention to provide a soil penetrating plate assembly which greatly facilitates the installation of conduit loops into the soil and which permits easy retrieval of the said penetrating plate and which is inexpensive to fabricate.

According to the above feature, from a broad aspect, the present invention provides a soil penetrating plate to position a flexible geothermal conduit loop in soil. The soil penetrating plate has a leading soil penetrating formation. Hook means is provided in the soil penetrating plate assembly and adapted to hook an end loop portion of the conduit loop. Attachment means is provided to secure the soil penetrating plate to a force transmitting means for displacing same in the soil to position the conduit loop thereinto.

BRIEF DESCRIPTION OF DRAWINGS

A preferred embodiment of the present invention will now be described with reference to the accompanying drawings in which:

FIG. 4 is a fragmented view showing a metal shaft having two opposed parallel rigid soil penetrating plates welded thereto in parallel relationship;

FIGS. 5A and 5B are top views showing different configurations of the soil penetrating plate and attachment to a shaft;

FIGS. 13A to 13C are side vies showing the manner in which a flexible geothermal conduit loop is hooked onto the soil penetrating lead edge of the soil penetrating plate;

FIG. 14A is a side view of a detachable coupling to which the soil penetrating plate is secured;

FIG. 14B is a front view of FIG. 14A;

FIG. 15 is a top section view showing a further embodiment of the soil penetrating plate of the present invention.

DESCRIPTION OF PREFERRED EMBODIMENTS

Figure 1:
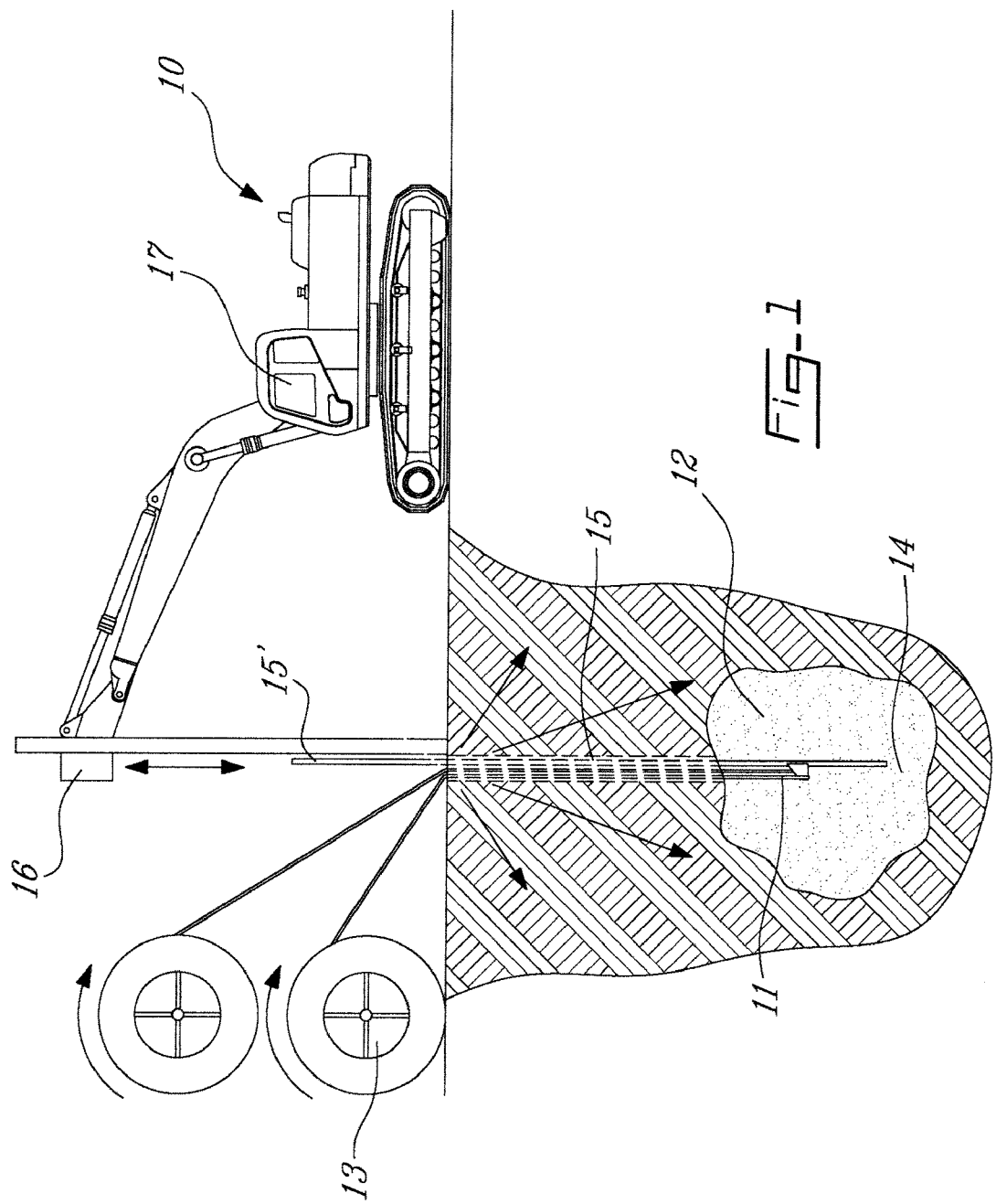
FIG. 1 is a schematic view illustrating how the flexible geothermal conduit loop is positioned into the soil by the use of the soil penetrating plate assembly of the present invention which is secured to a force transmitting shaft.

Referring now to the drawings and more particularly to FIG. 1, there is shown generally at 10 a schematic illustration of an equipment for installation of a flexible geothermal conduit loop 11 into the soil 12 using the soil penetrating plate 14 of the present invention. The flexible conduit loop is wound on a spool 13 and is drawn into the soil 12 by the soil penetrating plate 14 of the present invention. As hereinshown, the soil penetrating plate 14 is driven by a force transmitting shaft 15 which is connected thereto and driven into the soil by a dynamic force applied to the top end 15' of the shaft 15 by percussion blows of an impact element 16 of a pile driving machine 17. Although not shown the shaft 15 may be driven into the soil by a drilling machine converted to impact with the shaft. The shaft may comprise interconnected shaft sections.

Figure 2:
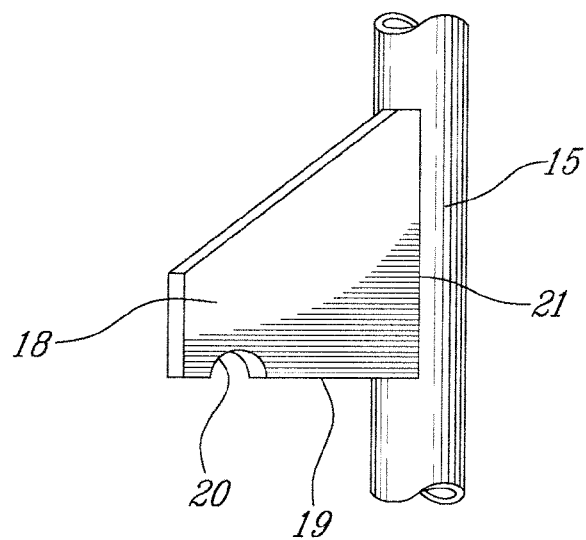
FIG. 2 is a fragmented section view showing the soil penetrating plate assembly in the form of a rigid metal soil penetrating wing welded to a steel shaft.

The soil penetrating plate 14 may have many forms as will be described herein. As shown in FIG. 2 the soil penetrating plate is in the form of a rigid metal wing 18 and it is provided with a leading soil penetrating formation, herein a profiled short straight leading edge 19 which is provided with hook means, herein in the form of a conduit retention notch 20, about which a curved end portion 11', see FIG. 11, of the loop 11 is retained and drawn into the soil by the shaft 15. The rigid metal wing 18 is welded to the shaft 15 or a shaft section or a tubular connector along its inferior edge 21 and that constitutes an attachment means to secure the plate assembly to a force transmitting means, herein the shaft 15.

Figure 3:
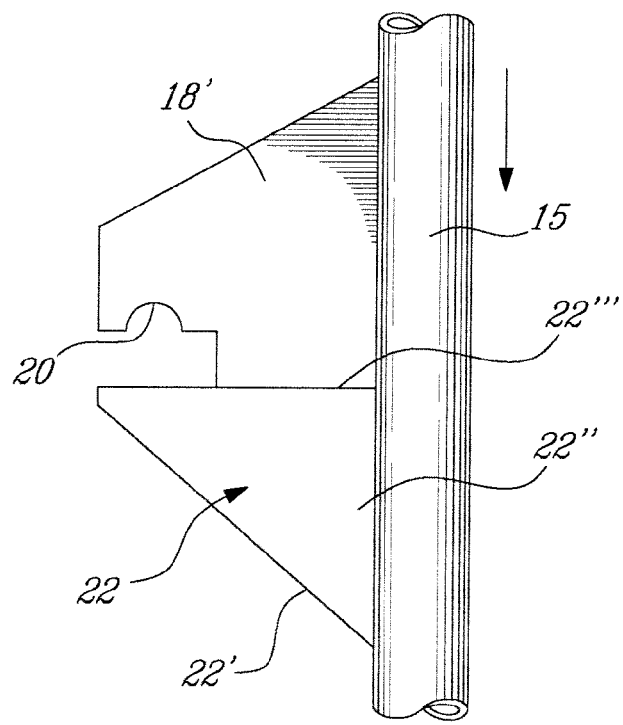
FIG. 3 is a side view of the soil penetrating plate showing a different configuration thereof and also showing a soil deflector secured thereto or to the metal shaft.

FIG. 3 shows the soil penetrating plate assembly having a different configuration, herein illustrated by reference numeral 18'. As hereinshown a leading soil deflector formation 22 is formed integral therewith whereby to loosen and deflect soil forwardly and outwardly as the soil penetrating plate assembly 18' is driven into the soil. Accordingly, the soil deflector formation 22 has a pointed end 22' and outwardly diverging side walls 22" and terminate in a wide top wall 22'''.

Referring to FIG. 4, there is shown another embodiment of the construction of the soil penetrating plate assembly. As shown in FIG. 4, the soil penetrating plate assembly has two plates 14 of the type as shown in FIGS. 2 and 3 or other configurations which are welded on opposed sides of the shaft 15, in parallel relationship, whereby to draw two flexible geothermal conduit loops 11 into the ground. Another arrangement of the soil penetrating plate assembly to draw two groups into the ground will be described later with reference to FIG. 10.

FIGS. 5A and 5B are cross-section views showing further configurations of the soil penetrating plate 14 of the present invention. As hereinshown, there are two soil penetrating plates 14 removably secured or fixedly secured to a force transmitting shaft 15 and adapted at its opposed ends of its leading edges to secure a conduit loop 11 thereto. The two soil penetrating plates 14" of FIG. 5A are secured at outwardly diverging angles and extend away from the force transmitting shaft 15 to maintain the conduit loop separated while they are driven or pulled into the soil. FIG. 5B shows a further version wherein a large soil penetrating plate 14''' is a straight plate secured to a side of the force transmitting shaft 15. The straight soil penetrating plate 14''' is provided with conduit retaining notches similar to those as shown in FIGS. 2 and 3.

Figure 6:
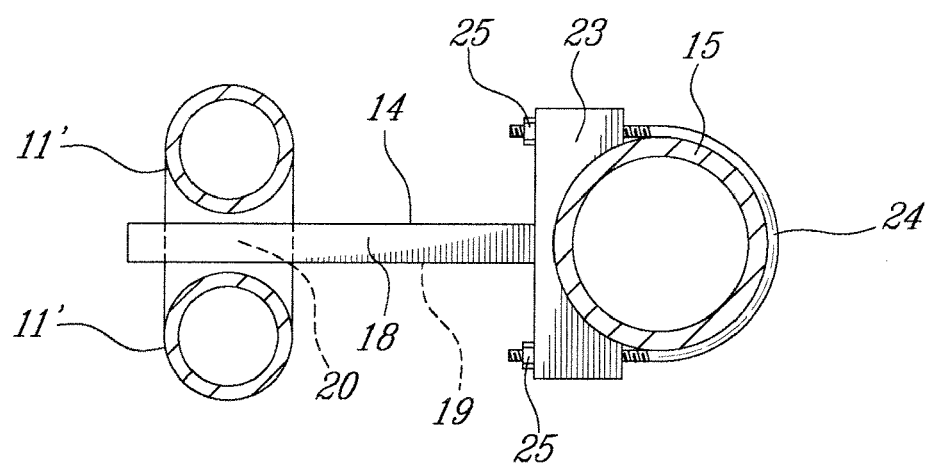
FIG. 6 is a transverse section view showing a detachable connection of a soil penetrating plate to a shaft.

FIG. 6 shows a still further embodiment of the soil penetrating plate assembly and as hereinshown the soil penetrating plate 14 is a straight rigid plate secured to a clamp wall 23 of a U-shaped clamp 24 whereby to be removably secured to the force transmitting shaft 15. The loop end portion 11' of the conduit loop is retained by a notch 20 formed in the leading edge 19 of the soil penetrating plate 14.

Figure 9:
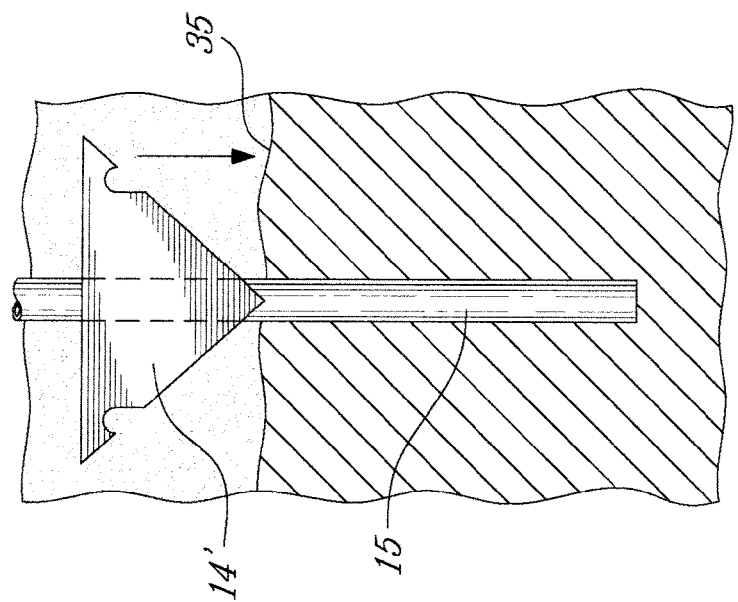
FIG. 9 is a schematic illustration showing a soil penetrating plate secured spaced from a penetrating end of a force transmitting shaft.
Figure 8:
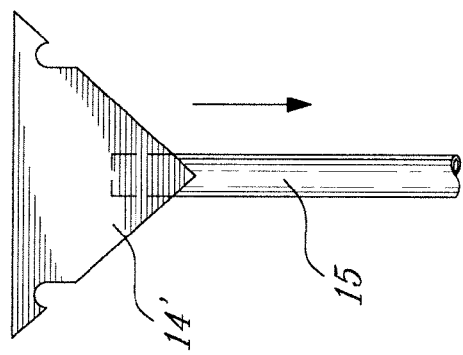
FIGS. 7 and 8 are schematic illustrations showing different force transmitting means for driving the soil penetrating plate into the soil.
Figure 7:
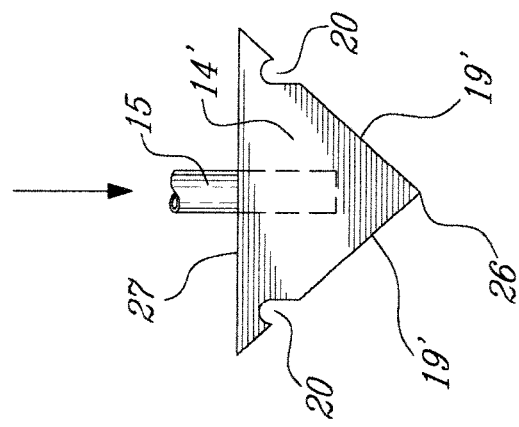

FIGS. 7, 8 and 9 are illustrations showing how the soil penetrating plate is positioned into the soil. As shown in FIG. 7, the soil penetrating plate has a V-shaped leading edge 19' which is defined by opposed slope edges diverging from an apex 26 thereof. The slope edges 19' are sharp edges to facilitate penetration into the soil. They are also provided with conduit retention notches 20. The V-shaped soil penetrating plate 14' is also coupled at a rear edge 27 thereof to a force transmitting shaft 15.

Figure 11:
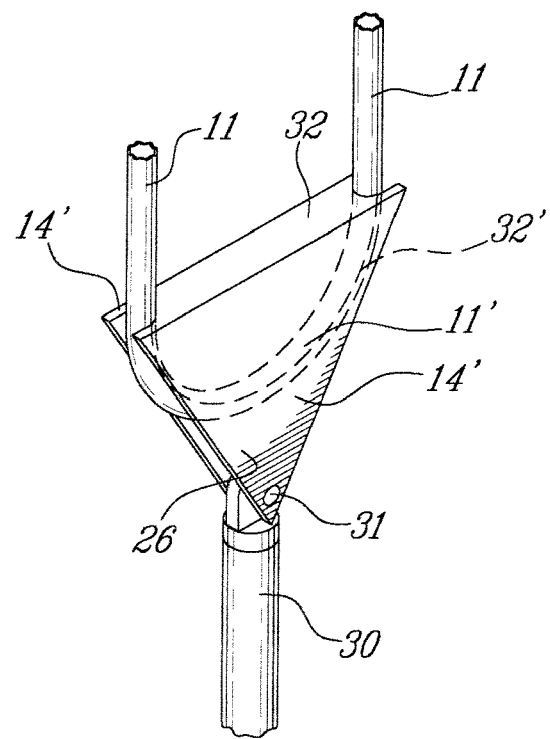
FIG. 11 is a simplified perspective view showing a further embodiment of the soil penetrating plate and wherein the plate is pulled into the soil to pull a flexible geothermal conduit loop thereinto.

In the embodiment of FIG. 11, the soil penetrating plate 14' is an assembly of two plates 13' separated by an insert 32 having a curved front end 32' on which the loop and portion 11' is supported when pulled through the soil is secured to a flexible pull cable 30 secured to the apex 26 of the V-shaped soil penetrating plate assembly 14' by a connector 31. The pull cable 30 pulls the V-shaped plate assembly 14' along a predetermined path into the soil and below a top surface thereof but in a curved path. Such conduit pulling devices are well known in the art.

Figures 13A, 13B:
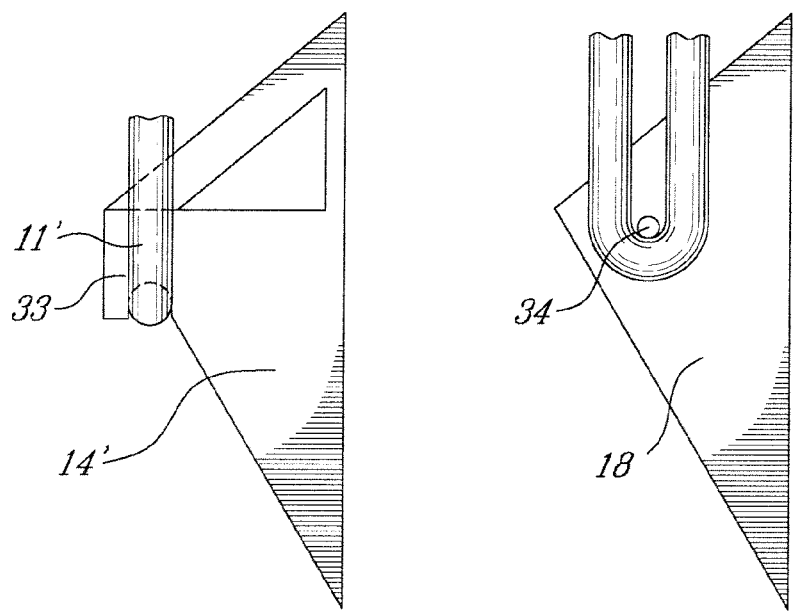

As shown in FIG. 13A, the hook means is constituted by a hook extension 33 formed in the top corners of the V-shaped soil penetrating plate 14' and it receives the loop end portion 11' of the conduit loop 11 whereby opposed loops may be drawn into the soil. FIG. 13B shows another modification of the conduit loop retention means. As hereinshown, the retention means is provided by a pin connector 34 projecting laterally from the wing 18 or opposed sides of the V-shaped plate 14' as shown in FIG. 11. FIG. 13C shows a still further embodiment wherein the loop end portion 11' is secured to the retention 20 by connecting cable loop 42 of predetermined tensile strength calculated to break when subjected to a resistance force generated by the conduit loop being drawn in the soil. When cable loop 42 breaks, the conduit loop 11 is released and remains in the soil at a predetermined depth. This prevents the conduit loop to be subject to excessive force when drawn through the soil and therefore be damaged thereby resulting in the removal of the conduit loop and incurring further costs.

Figure 10:
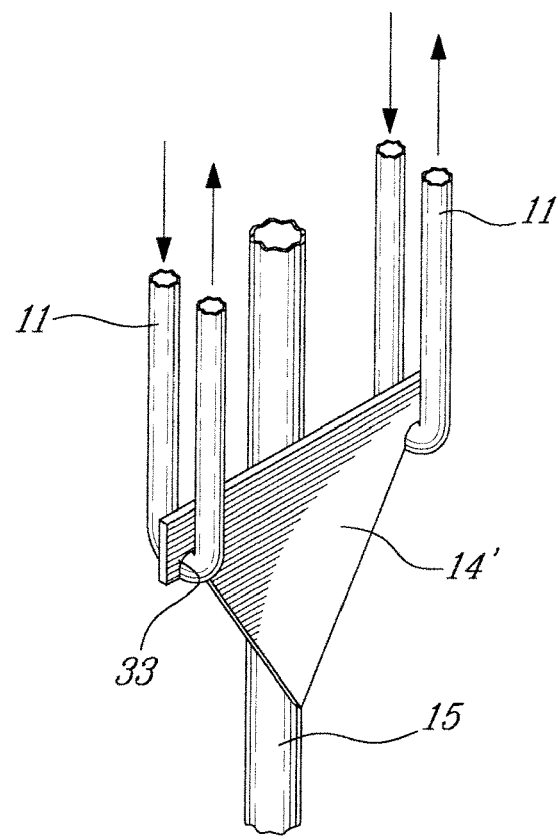
FIG. 10 is a perspective view showing a V-shaped soil penetrating plate having hooking means to secure two flexible geothermal conduit loops simultaneously into the soil.

As shown in FIGS. 8, 9 and 10, the soil penetrating plate, herein in the form of a V-shaped plate 14', is secured to the force penetrating shaft 15 but spaced from the end 15' thereof whereby to position the loops spaced above hard soil material 35 which is encountered as the force transmitting shaft 15 is driven into the soil or at a predetermined distance above bedrock. FIG. 10 shows a modification of FIG. 9 wherein the soil penetrating plate is provided with conduit retention notches 33 of the type shown in FIG. 13A whereby to position two flexible geothermal conduit loops 11 simultaneously into the soil.

Figure 12:
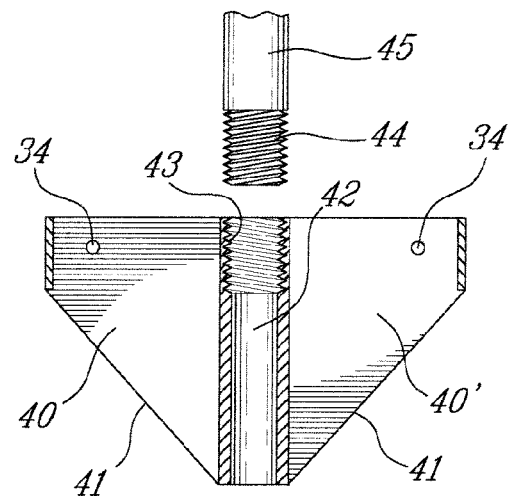
FIG. 12 is a side view of a further embodiment of the soil penetrating plate of the present invention which is secured to a tubular connector which is detachably securable to a drive shaft.

With reference now to FIG. 12, there is shown a still further embodiment of the soil penetrating plate of the present invention. As hereinshown, there are two soil penetrating plates 40 and 40' each having a rearwardly sloped straight leading soil penetrating edge 41 which is somewhat sharper for ease of penetration into the soil. The plates 40 and 40' are immovably secured to a tubular coupling 42. Shaft coupling means in the form of an inner threaded rear section 43 in the coupling provide for threaded engagement with a threaded end 44 of a shaft section 45 of a force transmitting shaft assembly, not shown but well known in the art. Appropriate conduit attachment means is provided in the rear corner portions of the plates 40 and 40'. As hereinshown, these hook means are in the form of pins 34, as illustrated in FIG. 13B, whereby to draw into the soil a flexible geothermal conduit loop in a manner as illustrated in FIG. 11.

With reference now to FIGS. 14A and 14B, there are shown modifications to the soil penetrating plate of FIG. 12. As hereinshown, the soil penetrating plate 52 is secured to the shaft 15 by attaching flanges 45 which are welded to the shaft 15 along welded edge 46 and to a rear of the soil penetrating plates 52 along weld line 47. The geothermal conduit loop is herein constituted by an end conduit section permanently secured in a trailing edge cavity 51 of the soil penetrating plate 52 which is herein in the form of a solid V-shaped plate projecting outwardly from the shaft 15 form its forward end connector 42. The end conduit section 50 has opposed free ends 53 and 53' adapted to be secured to opposed longitudinal conduit sections 54 to form the conduit loop.

FIG. 15 shows a still further embodiment of the soil penetrating plate assembly. As hereinshown a pair of soil penetrates 55 is secured to a force transmitting shaft or connector 56 by plate connecting flanges 57 formed integral with the plates and welded on opposed sides of the shaft or tubular connector 56. The plates 55 have outwardly diverging plate sections 58 and have an angled end flange section 59 whereby a curved condition 60 may be permanently secured thereto. The curved conduit 60 is made of suitable material such as metallic tubular material and constitutes a loop end section such as the loop end section 50 as illustrated in FIG. 14B. The curved conduit 60 has opposed free ends 61 adapted to be secured to opposed longitudinal conduit sections such as the sections 54 shown in FIG. 14B to form the conduit loop. As shown in FIG. 15, a further pair of soil penetrating plates 55' may also be secured to the shaft or tubular connector 56 and diametrically opposed to the pair of plates 55 whereby to connect a further flexible geothermal conduit loop thereto whereby two loops are driven into the soil at the same time.

Figure 16:
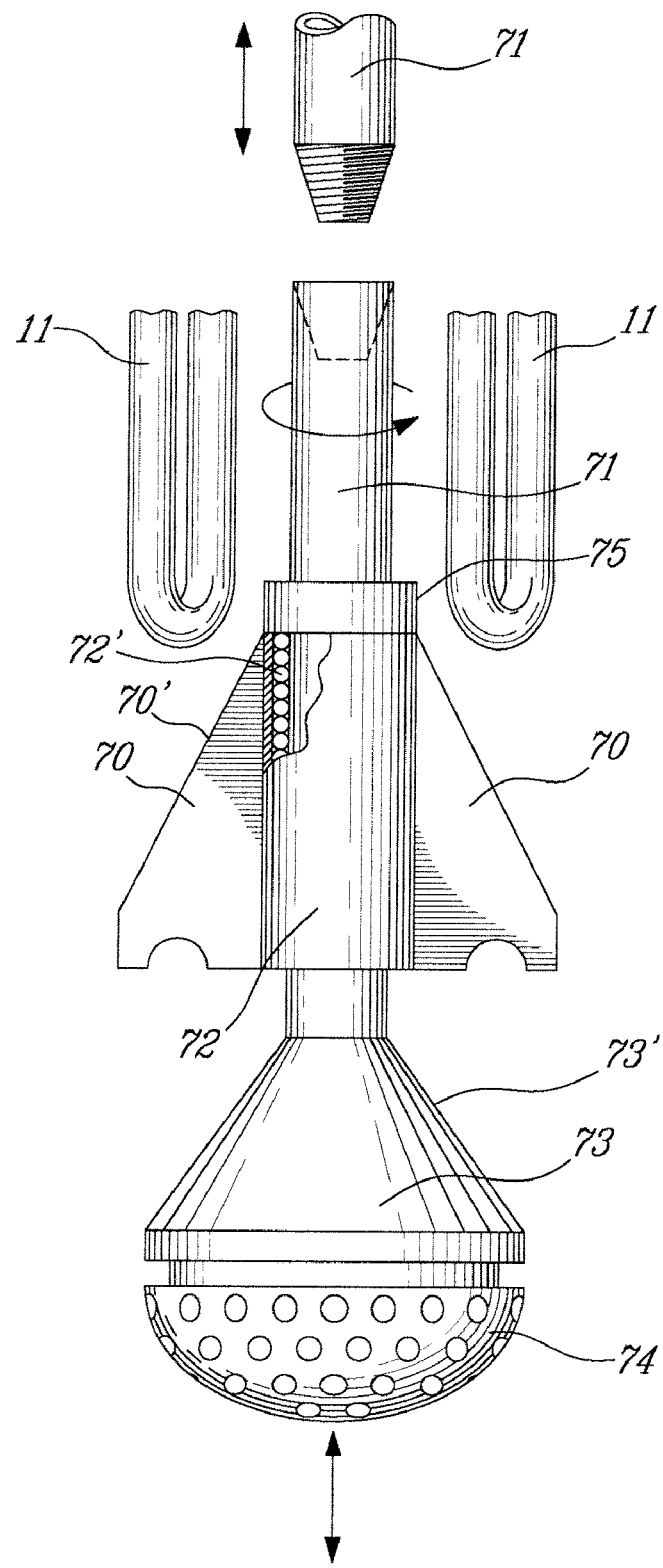
FIG. 16 is an exploded view showing a further embodiment for positioning the flexible geothermal conduit loop into dense soil conditions.

FIG. 16 shows a still further embodiment for positioning the conduit loop(s) 11 into dense soil conditions. As hereinshown the soil penetrating plate assembly 70 is constituted by two plates 70 secured to a drill rod 71 by a sleeve 72 having internal ball bearings 72' to maintain the assembly 70 substantially stable as the drill rod 71 rotates and advances in the soil. The sleeve 72 is retained in position as a collar ring 75 secured to the drill rod 71 and rotating therewith the sleeve 72 is located rearwardly of a drill head 73 provided with the usual carbide bit 74. The drill rod 71 is formed by interconnectable rod sections as well known in the art and illustrated herein. The drill head 73 is imparted rotation and/or percussion to advance in the dense soil. Once the drill head 73 has reached its predetermined depth, it is retracted to release the conduit loops in the soil, due to the taper or slope 70' of the plates 70 and the cone shape 73' of the drill head, the drill head 73 does not cause any damage to the conduit loops 11 when retracted. The cone shape 73' of the drill head flares outwardly towards the free end containing the carbide bit 74. FIG. 16 illustrates the conduct loops 11 positioned spaced apart after having been disconnected from the plate assembly 70 and the drill head retracted.

It is within the ambit of the present invention to cover any obvious modifications of the embodiments as described herein, provided such modifications fall within the scope of the appended claims.

I claim:

1. A soil penetrating plate to draw and position a flexible geothermal conduit loop directly in unexcavated soil, said soil penetrating plate having a leading soil penetrating formation to loosen and deflect soil as said soil penetrating plate is forced to be displaced therein, hook means in said soil penetrating plate adapted to hook an end loop portion of said conduit loop, and attachment means to secure said soil penetrating plate to a force transmitting shaft which is driven into said soil by a dynamic force applied to a top end of said force transmitting shaft for displacing said soil penetrating plate in soil to simultaneously pull said conduit loops in said soil, said soil penetrating plate being retrieved by withdrawing said force transmission shaft with said conduit loop remaining in said soil in direct contact therewith, said leading soil penetrating formation being forward edge of said plate shaped for ease of displacement in the soil.

2. A soil penetrating plate as claimed in claim 1 wherein said hook means is a conduit retention notch formed in said forward edge and dimensioned to receive said end loop portion in close fit therein.

3. A soil penetrating plate as claimed in claim 1 wherein said soil penetrating plate has a V-shaped leading edge defining opposed sloped edges diverging from an apex thereof, said sloped edges being generally sharp edges to facilitate penetration in soil, each said sloped edge having said hook means associated therewith.

4. A soil penetrating plate as claimed in claim 3 wherein each said hook means is adapted to hook said end loop portion of a respective one of two of said conduit loops.

5. A soil penetrating plate as claimed in claim 3 wherein each said hook means is adapted to hook one of said conduit loop on opposed sides of each said opposed sloped edges.

6. A soil penetrating plate as claimed in claim 3 wherein said force transmitting means is a force transmitting shaft secured at a top end to an impacting means to drive said soil penetrating plate in soil.

7. A soil penetrating plate as claimed in claim 6 wherein said soil penetrating plate is immovably secured to at least a detachable portion of said force transmitting shaft.

8. A soil penetrating plate as claimed in claim 6 wherein said soil penetrating plate is removably secured to said force transmitting shaft.

9. A soil penetrating plate as claimed in claim 6 wherein said soil penetrating plate is welded to a side of said force transmitting shaft.

10. A soil penetrating plate as claimed in claim 3 wherein said force transmitting means is a pull-cable secured to an apex connection of said V-shaped leading edge for pulling said soil penetrating plate and a conduit loop in soil.

11. A soil penetrating plate as claimed in claim 1 wherein said soil penetrating plate is a side plate immovably secured to a side of a shaft section of said force transmitting shaft.

12. A soil penetrating plate as claimed in claim 11 there are two or more of said side plates secured about said shaft section, each side plate having a retention cavity formed in said forward edge and dimensioned to receive said end loop portion of said conduit in close fit therein.

13. A soil penetrating plate as claimed in claim 2 wherein there is further provided a soil deflector blade secured to said shaft section and spaced forwardly of said retention cavity to loosen soil forwardly thereof as said soil penetrating plate and soil deflector blade are driven into the soil.

14. A soil penetrating plate as claimed in claim 1 wherein there is at least one pair of said soil penetrating plates secured to a tubular coupling, said hook means being located rearwardly of said forward edge, said end loop portion being hooked between said pair of soil penetrating plates.

15. A soil penetrating plate as claimed in claim 14 wherein said tubular coupling is a shaft engaging means at a trailing end thereof for removable connection with a drive shaft of said force transmitting means.

16. A soil penetrating plate as claimed in claim 1 wherein there is at least one pair of said soil penetrating plates secured to a force transmitting shaft, and wherein a curved conduit is immovably secured therebetween, said curved conduit constituting said end loop portion of said conduit loop, said curved conduit having opposed free ends thereof adapted to be secured to opposed longitudinal conduit sections forming said geothermal conduit loop.

* * * * *